US012613849B1

(12) United States Patent
Skaaning

(10) Patent No.: US 12,613,849 B1
(45) Date of Patent: Apr. 28, 2026

(54) SYSTEM AND METHOD FOR STATE-DEPENDENT INFORMATION INTEGRATION IN A MODULAR AI ARCHITECTURE

(71) Applicant: Whitebox AI LLC, Sheridan, WY (US)

(72) Inventor: Claus Skaaning, Aalborg (DK)

(73) Assignee: Whitebox AI LLC

( * ) Notice: Subject to any disclaimer, the term of this patent is extended or adjusted under 35 U.S.C. 154(b) by 0 days.

(21) Appl. No.: 19/274,289

(22) Filed: Jul. 18, 2025

(51) Int. Cl.
G06F 16/22 (2019.01)

(52) U.S. Cl.
CPC ................................. G06F 16/2237 (2019.01)

(58) Field of Classification Search
CPC .................................................. G06F 16/2237
See application file for complete search history.

(56) References Cited

U.S. PATENT DOCUMENTS

2020/0342326 A1\* 10/2020 Rahnama Moghaddam ...............
G06N 3/09
2021/0287114 A1\* 9/2021 Zhou ...................... G06N 20/20

\* cited by examiner

*Primary Examiner* — Etienne P Leroux
*Assistant Examiner* — Farhad Agharahimi
(74) *Attorney, Agent, or Firm* — Rotek Law

(57) ABSTRACT

A system and method are disclosed for integrating modular artificial intelligence (AI) components using a Field Integration Matrix (FIM) that performs real-time, state-dependent, and directionally modulated information propagation. The system includes a processor and memory configured to receive influence vectors from multiple AI modules and project them into designated FIM nodes. Each node maintains a state vector and a propagation tensor, dynamically updated using a Lipschitz-bounded modulation function to ensure mathematically provable convergence. The FIM executes an iterative cycle comprising contribution, modulation, and propagation phases. Nodes support hybrid symbolic and subsymbolic representations, enabling unified cognitive processing. Feedback mechanisms route integrated context back to originating modules. The architecture supports multi-speed processing, multi-resolution scaling, and hardware implementation for real-time deployment. Embodiments include autonomous agents, human-in-the-loop systems, brain-computer interfaces, and narrative-driven AI.

20 Claims, 15 Drawing Sheets

AI-based Computing System 104

Memory 102

Plurality of AI modules 112

System Bus 106

Storage Unit 108

Hardware Processor(s) 110

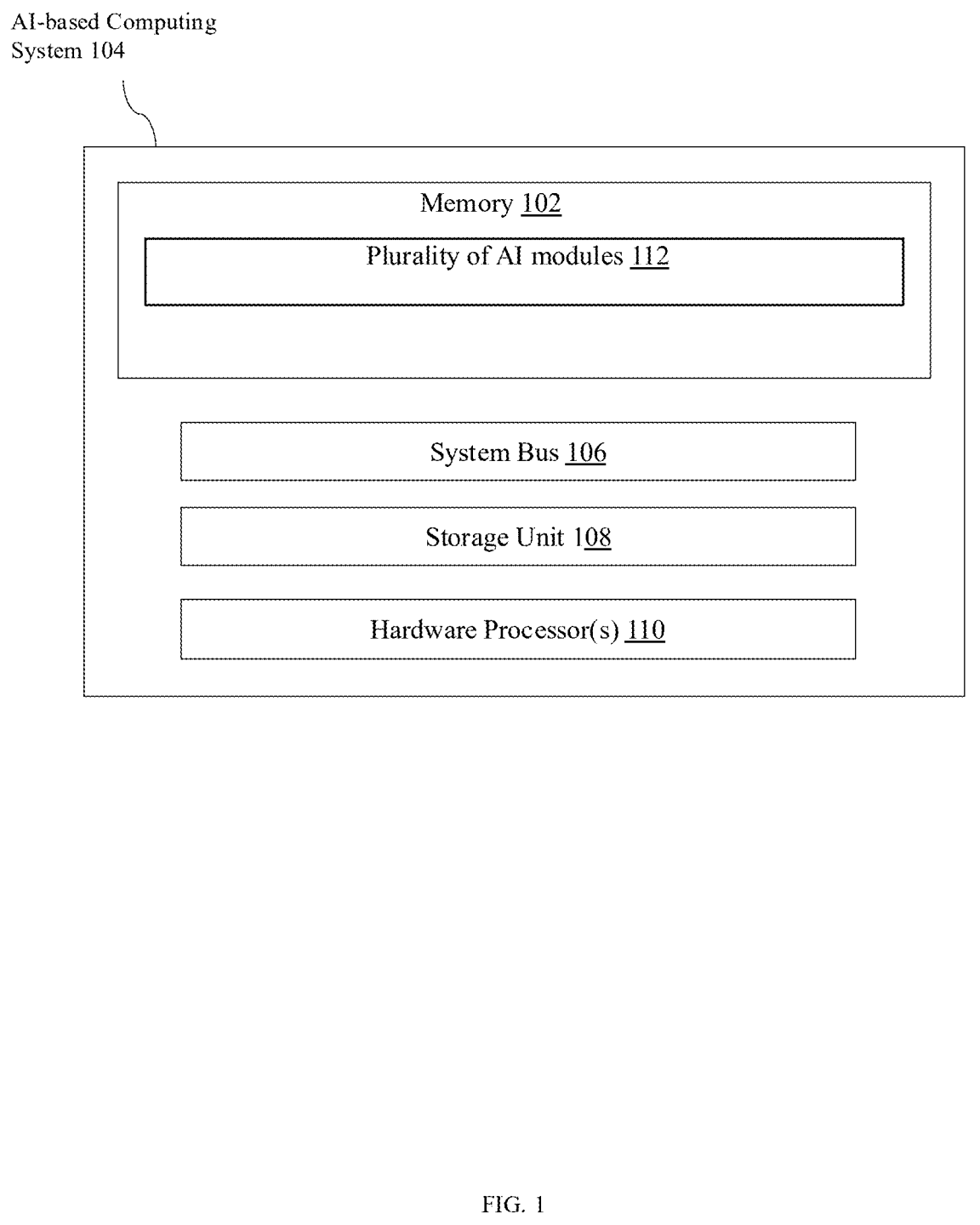

AI-based Computing
System 104

Memory 102

Plurality of AI modules 112

System Bus 106

Storage Unit 108

Hardware Processor(s) 110

FIG. 1

Define FIM topological structure with interconnected nodes — 202

Initialize state vector for each node — 204

Assign propagation tensor to each node — 206

Map AI module outputs to FIM nodes — 208

Set convergence threshold and Lipschitz constant — 210

Assign node-level parameters — 212

Receive influence vectors from AI modules — 302

FIM updates its propagation tensor based on its current internal state vector — 304

Compute propagation tensor modulation per node — 306

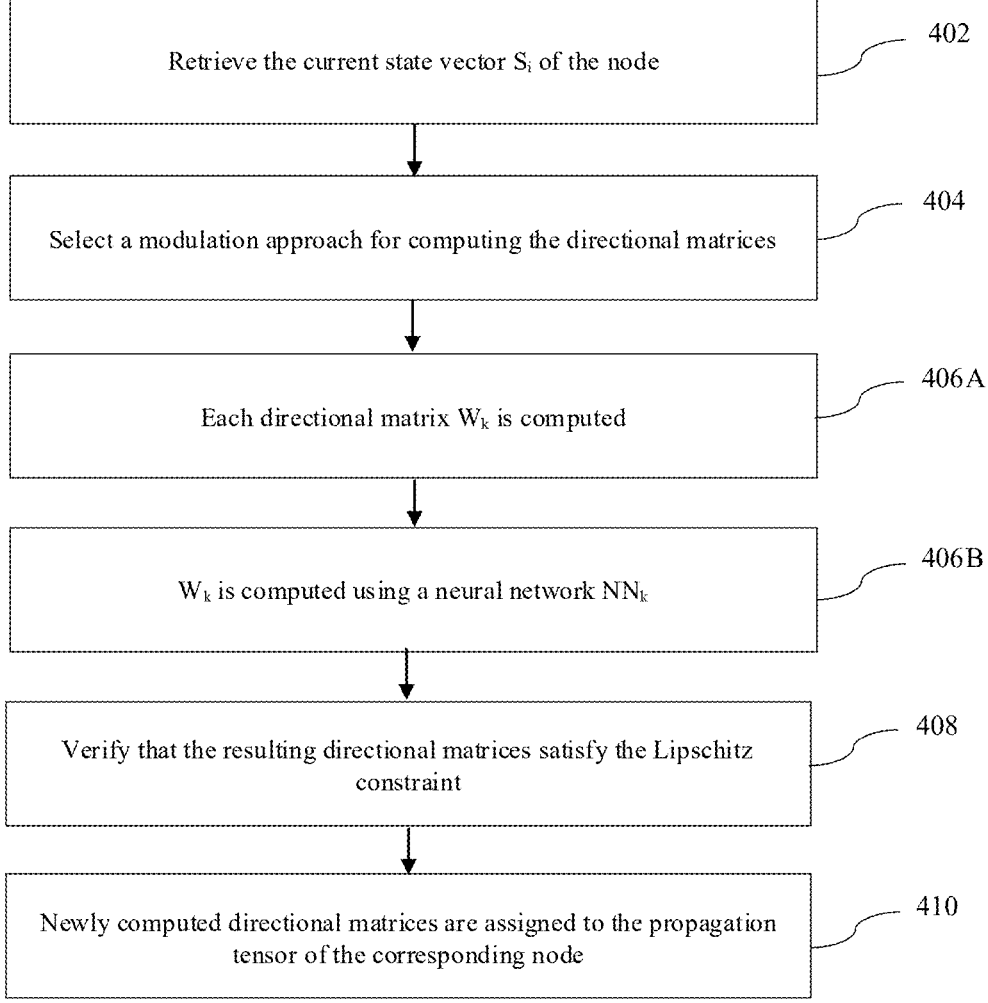

Retrieve the current state vector $S_i$ of the node — 402

Select a modulation approach for computing the directional matrices — 404

Each directional matrix $W_k$ is computed — 406A $W_k$ is computed using a neural network $NN_k$ — 406B Verify that the resulting directional matrices satisfy the Lipschitz constraint — 408

Newly computed directional matrices are assigned to the propagation tensor of the corresponding node — 410

FIG. 4

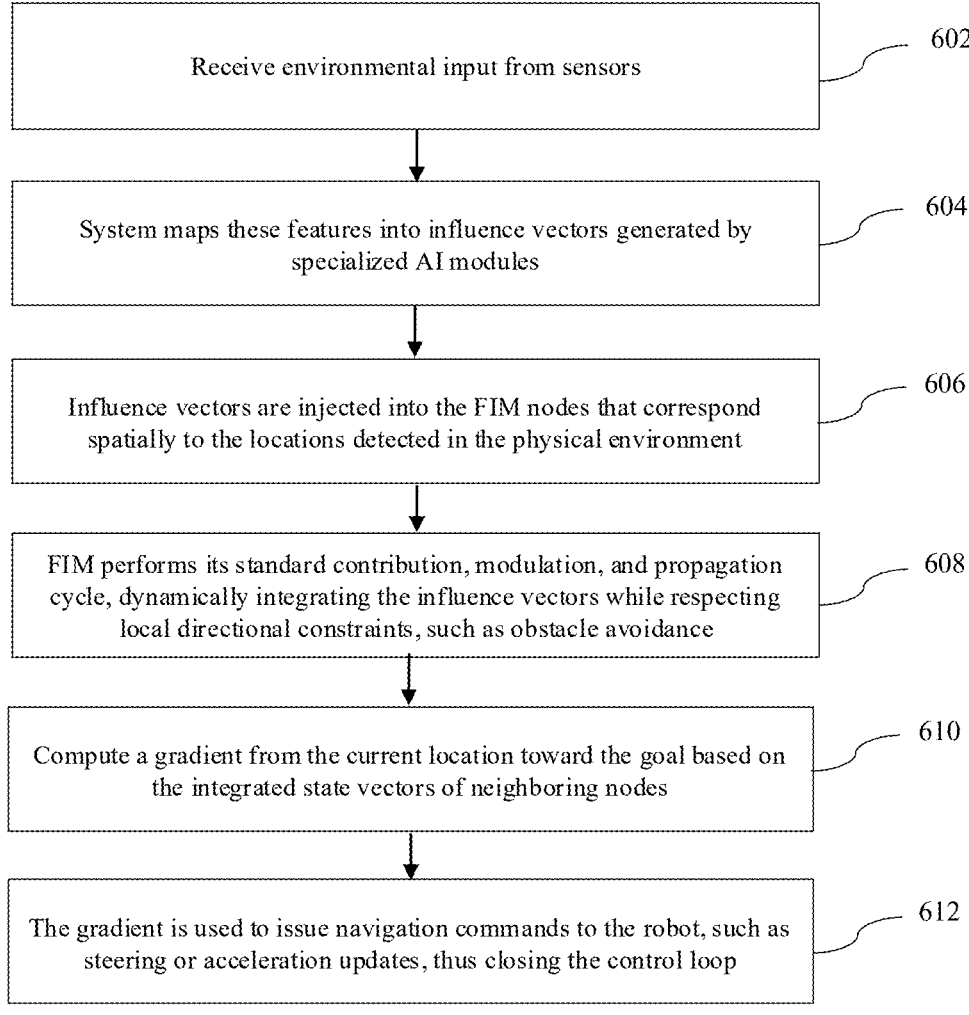

Receive environmental input from sensors — 602

System maps these features into influence vectors generated by specialized AI modules — 604

Influence vectors are injected into the FIM nodes that correspond spatially to the locations detected in the physical environment — 606

FIM performs its standard contribution, modulation, and propagation cycle, dynamically integrating the influence vectors while respecting local directional constraints, such as obstacle avoidance — 608

Compute a gradient from the current location toward the goal based on the integrated state vectors of neighboring nodes — 610

The gradient is used to issue navigation commands to the robot, such as steering or acceleration updates, thus closing the control loop — 612

FIG. 6

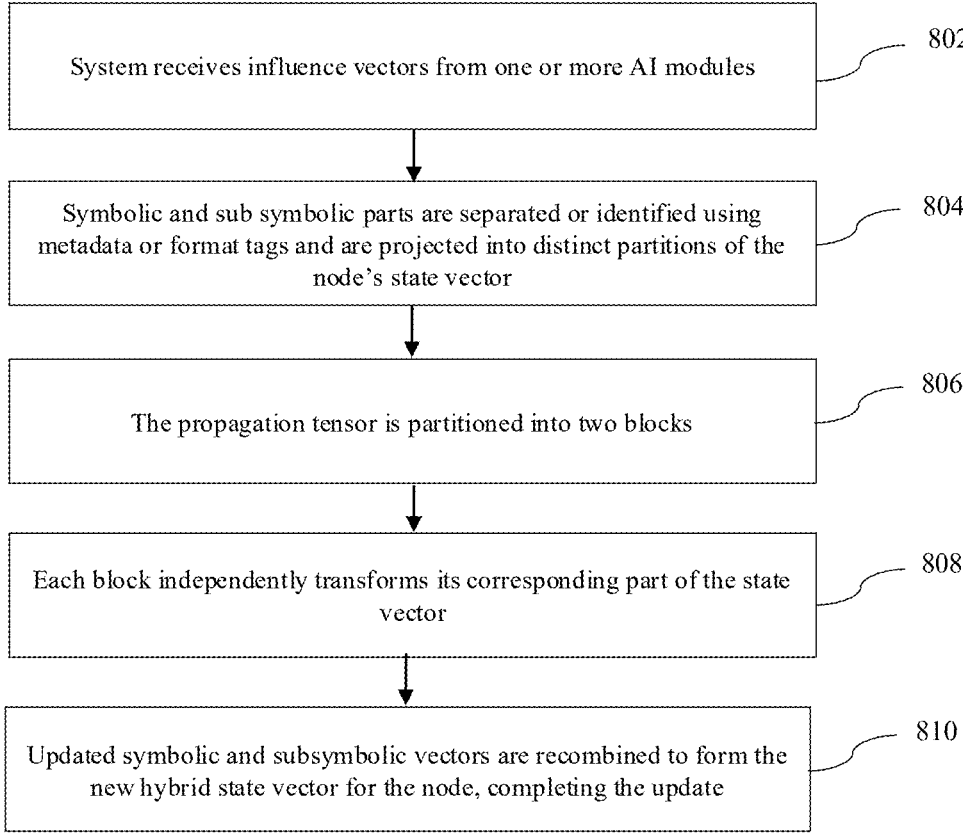

System receives influence vectors from one or more AI modules — 802

Symbolic and sub symbolic parts are separated or identified using metadata or format tags and are projected into distinct partitions of the node's state vector — 804

The propagation tensor is partitioned into two blocks — 806

Each block independently transforms its corresponding part of the state vector — 808

Updated symbolic and subsymbolic vectors are recombined to form the new hybrid state vector for the node, completing the update — 810

FIG. 8

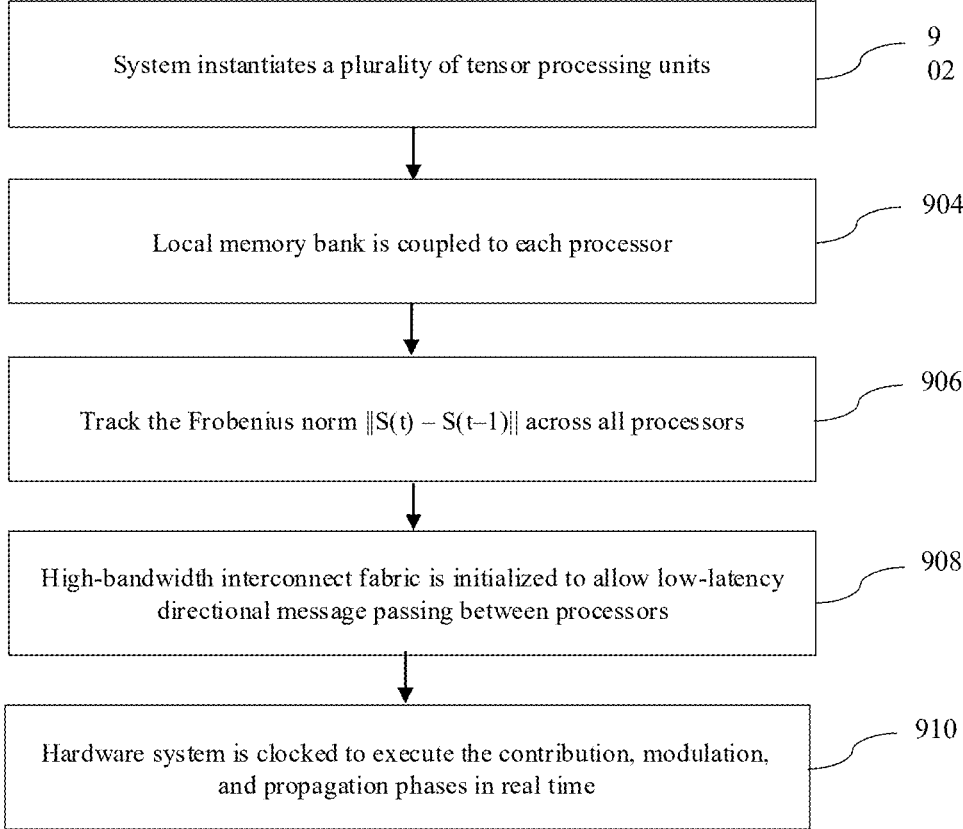

System instantiates a plurality of tensor processing units 9
02

Local memory bank is coupled to each processor

904

Track the Frobenius norm $\|S(t) - S(t-1)\|$ across all processors

906

High-bandwidth interconnect fabric is initialized to allow low-latency directional message passing between processors

908

Hardware system is clocked to execute the contribution, modulation, and propagation phases in real time

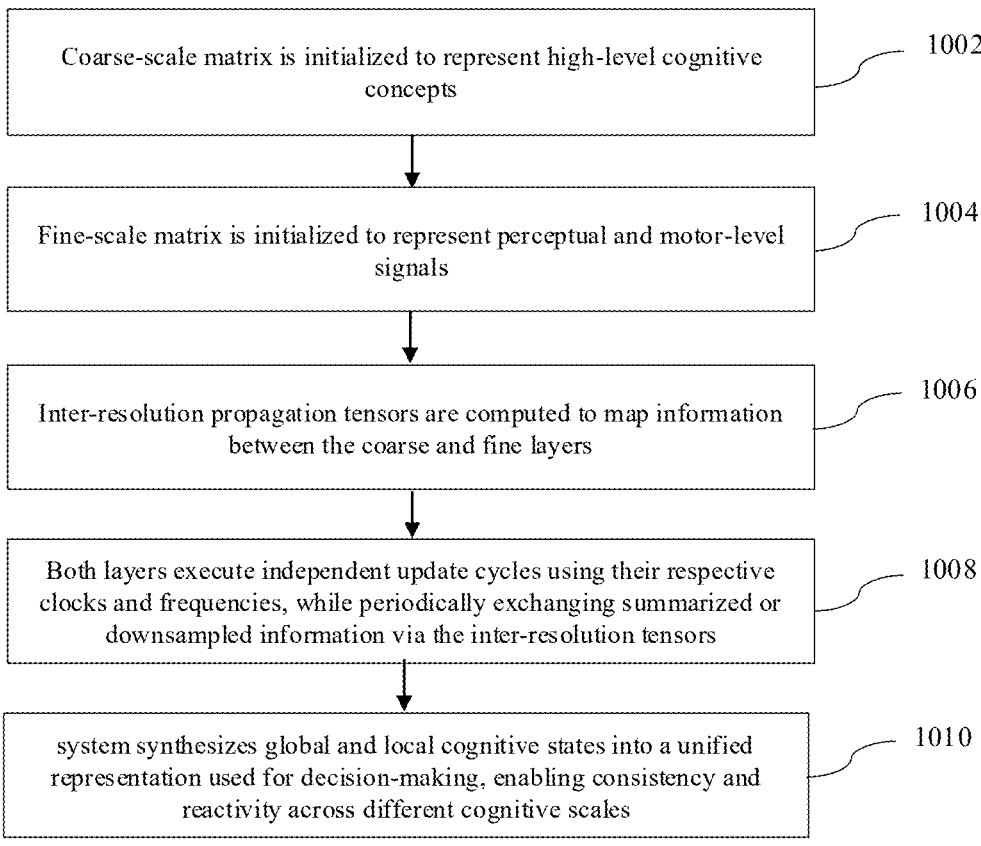

Coarse-scale matrix is initialized to represent high-level cognitive concepts — 1002

Fine-scale matrix is initialized to represent perceptual and motor-level signals — 1004

Inter-resolution propagation tensors are computed to map information between the coarse and fine layers — 1006

Both layers execute independent update cycles using their respective clocks and frequencies, while periodically exchanging summarized or downsampled information via the inter-resolution tensors — 1008 system synthesizes global and local cognitive states into a unified representation used for decision-making, enabling consistency and reactivity across different cognitive scales — 1010

FIG. 10

A set of system architectures are identified for comparison    — 1102

Evaluation metrics are selected across five technical axes    — 1104

Each architecture is assessed against the metrics using controlled benchmarks or formal feature matrices    — 1106

System generates a comparative summary showing the advantages of the FIM architecture    — 1108

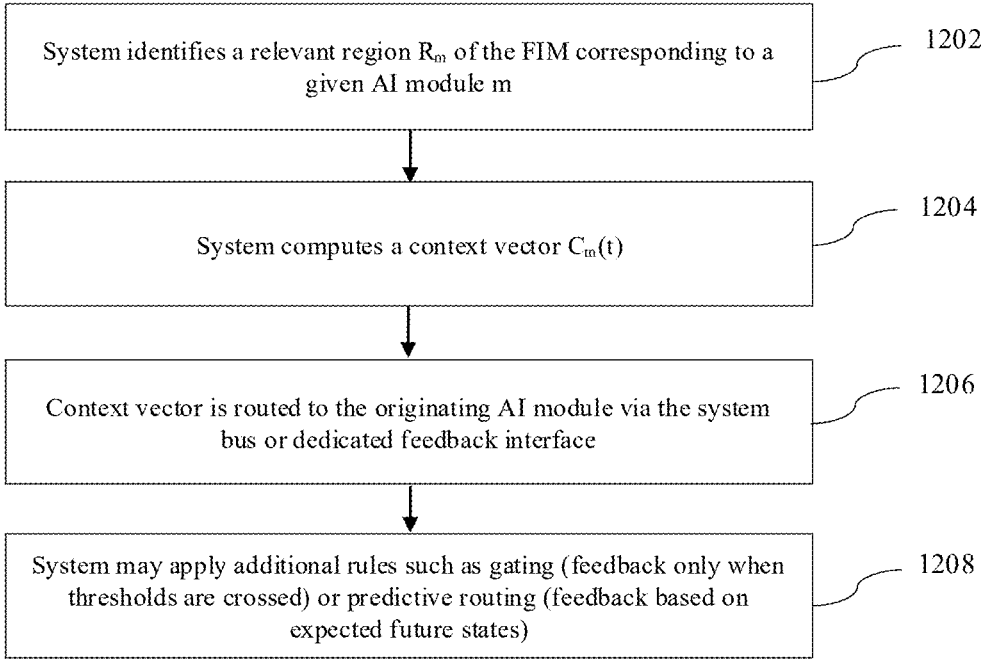

| System identifies a relevant region $R_m$ of the FIM corresponding to a given AI module m | 1202 |

| System computes a context vector $C_m(t)$ | 1204 |

| Context vector is routed to the originating AI module via the system bus or dedicated feedback interface | 1206 |

| System may apply additional rules such as gating (feedback only when thresholds are crossed) or predictive routing (feedback based on expected future states) | 1208 |

FIG. 12

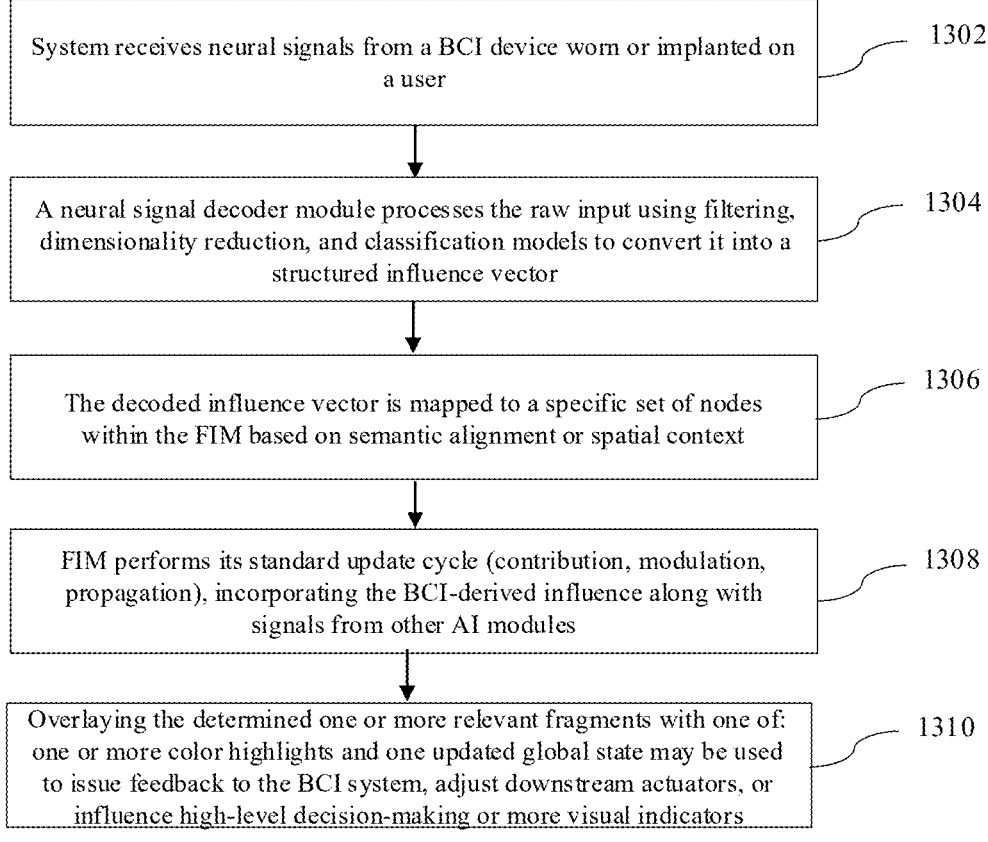

System receives neural signals from a BCI device worn or implanted on a user — 1302

A neural signal decoder module processes the raw input using filtering, dimensionality reduction, and classification models to convert it into a structured influence vector — 1304

The decoded influence vector is mapped to a specific set of nodes within the FIM based on semantic alignment or spatial context — 1306

FIM performs its standard update cycle (contribution, modulation, propagation), incorporating the BCI-derived influence along with signals from other AI modules — 1308

Overlaying the determined one or more relevant fragments with one of: one or more color highlights and one updated global state may be used to issue feedback to the BCI system, adjust downstream actuators, or influence high-level decision-making or more visual indicators — 1310

FIG. 13

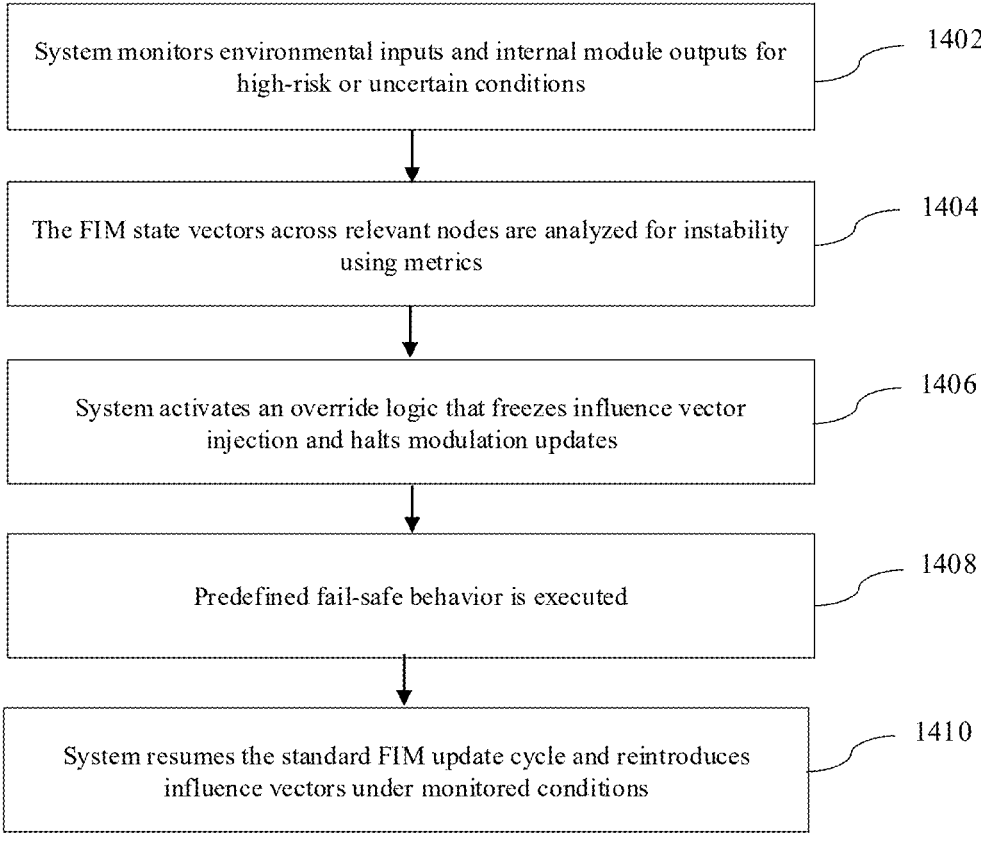

System monitors environmental inputs and internal module outputs for high-risk or uncertain conditions — 1402

The FIM state vectors across relevant nodes are analyzed for instability using metrics — 1404

System activates an override logic that freezes influence vector injection and halts modulation updates — 1406

Predefined fail-safe behavior is executed — 1408

System resumes the standard FIM update cycle and reintroduces influence vectors under monitored conditions — 1410

FIG. 14

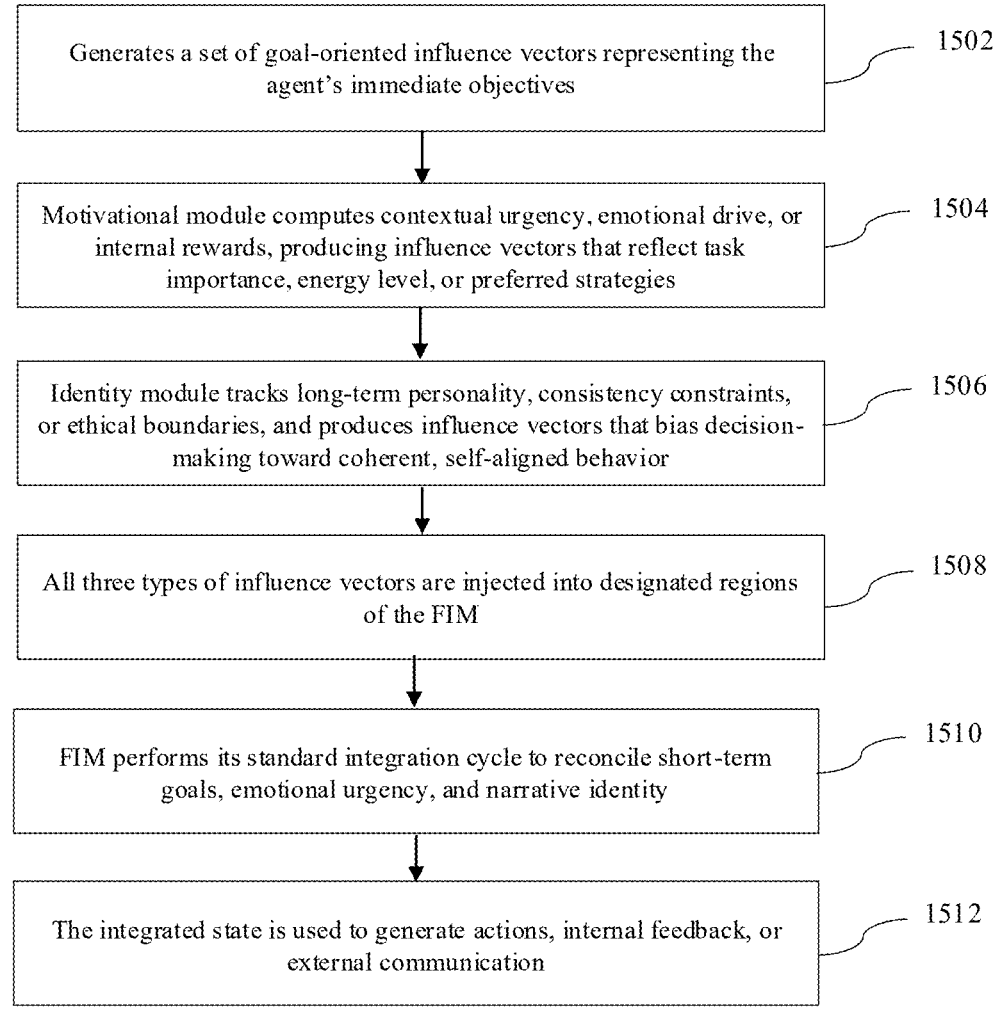

Generates a set of goal-oriented influence vectors representing the agent's immediate objectives — 1502

Motivational module computes contextual urgency, emotional drive, or internal rewards, producing influence vectors that reflect task importance, energy level, or preferred strategies — 1504

Identity module tracks long-term personality, consistency constraints, or ethical boundaries, and produces influence vectors that bias decision-making toward coherent, self-aligned behavior — 1506

All three types of influence vectors are injected into designated regions of the FIM — 1508

FIM performs its standard integration cycle to reconcile short-term goals, emotional urgency, and narrative identity — 1510

The integrated state is used to generate actions, internal feedback, or external communication — 1512

FIG. 15

SYSTEM AND METHOD FOR STATE-DEPENDENT INFORMATION INTEGRATION IN A MODULAR AI ARCHITECTURE

FIELD OF INVENTION

Embodiments of the present disclosure relate to artificial intelligence architectures and more particularly to a hardware-grounded system and method for integrating heterogeneous cognitive outputs from modular AI subsystems into a coherent global decision-making process.

BACKGROUND

As artificial intelligence (AI) systems grow in complexity, modular designs involving specialized subsystems-such as symbolic reasoners, neural networks, and domain-specific AI agents—have become increasingly prevalent. However, coherently integrating outputs from these diverse modules remains a significant challenge, particularly in safety-critical and real-time environments such as robotics, autonomous navigation, and human-AI collaboration.

Existing architectures such as Graph Neural Networks (GNNs), Neural Cellular Automata (NCAs), and attention-based transformers are limited by their reliance on abstract computation over arbitrary graphs, lack of convergence guarantees, or inability to adapt propagation behavior based on the content being processed. Moreover, these systems often do not provide a stable, interpretable, or feedback-capable global state that can regulate subsystem behaviors in real time.

Hence, there exists a need for an active, self-shaping computational medium capable of integrating multi-modal AI outputs, ensuring mathematical convergence, and providing real-time feedback control across modular systems.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

The present disclosure provides a system and method for state-dependent information integration in modular AI architectures, implemented via a Field Integration Matrix (FIM) comprising a lattice of computational nodes.

According to one embodiment, a hardware-based AI integration system includes at least one processor and a memory communicatively coupled to the processor. The memory stores instructions which, when executed, cause the processor to perform operations comprising:

Receiving influence vectors from a plurality of specialized AI modules;

Initializing a FIM comprising a plurality of nodes, each having a state vector and a local propagation tensor;

Dynamically modulating the propagation tensor at each node using a Lipschitz-continuous function of its current state vector, with a contraction constant $L \leq 0.9$; the modulation function characterized by a bounded gain factor or Lipschitz constant less than 1, ensuring contraction behavior and monotonic convergence Iteratively updating state vectors through a multi-phase update cycle including contribution, modulation, and anisotropic propagation phases;

Monitoring convergence within a bounded number of iterations defined by: $Tmax \leq \log(\|S(0)\|/\varepsilon)/\log(1/L)$; $\|S(0)\|$ denotes the Frobenius norm of the initial global state. The logarithm base is assumed to be natural logarithm (base e).

Sending feedback signals from the integrated FIM state to modulate outputs from the specialized AI modules.

The disclosure also provides a corresponding computer-implemented method, comprising similar steps executed via one or more processors. The architecture supports hybrid symbolic-subsymbolic processing, multi-speed cognitive updates, real-time operation, and application in physical systems such as robots and autonomous vehicles.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope.

BRIEF DESCRIPTION OF DRAWINGS

The disclosure will be described and explained with additional specificity and detail with the accompanying figures in which:

FIG. 1 illustrates a high-level architecture diagram of the AI integration system, comprising a processor, memory, convergence subsystem, and a plurality of AI modules interfaced via a Field Integration Matrix (FIM), in accordance with an embodiment of the present disclosure.

FIG. 4 is a flowchart illustrating an example method for dynamically modulating the propagation tensor at each node of the Field Integration Matrix (FIM), in accordance with an embodiment of the present disclosure.

FIG. 6 is a flowchart illustrating an example method for applying influence vectors from AI modules to spatially aligned FIM nodes during robotic navigation, in accordance with an embodiment of the present disclosure.

FIG. 8 is a flowchart illustrating a method for hybrid symbolic and subsymbolic integration within each FIM node, in accordance with an embodiment of the present disclosure.

FIG. 9 is a flowchart illustrating a hardware implementation of the Field Integration Matrix (FIM) using a distributed array of tensor processors, memory banks, and convergence monitors for real-time execution, in accordance with an embodiment of the present disclosure.

FIG. 10 is a flowchart illustrating a multi-resolution Field Integration Matrix (FIM) architecture comprising coarse-scale and fine-scale layers connected via inter-resolution propagation tensor, in accordance with an embodiment of the present disclosure.

FIG. 12 is a flowchart illustrating a feedback mechanism by which context vectors are computed from the FIM and routed back to corresponding AI modules to close the cognitive loop, in accordance with an embodiment of the present disclosure.

FIG. 13 is a flowchart illustrating an example method for integrating signals from a brain-computer interface (BCI) into the Field Integration Matrix (FIM), in accordance with an embodiment of the present disclosure.

FIG. 14 is a flowchart illustrating a method for deploying the Field Integration Matrix (FIM) in safety-critical scenarios, in accordance with an embodiment of the present disclosure.

FIG. 15 is a flowchart illustrating a method for integrating outputs from planning, motivational, and identity modules into a coherent cognitive state using the Field Integration Matrix (FIM), in accordance with an embodiment of the present disclosure.

Figure 2:
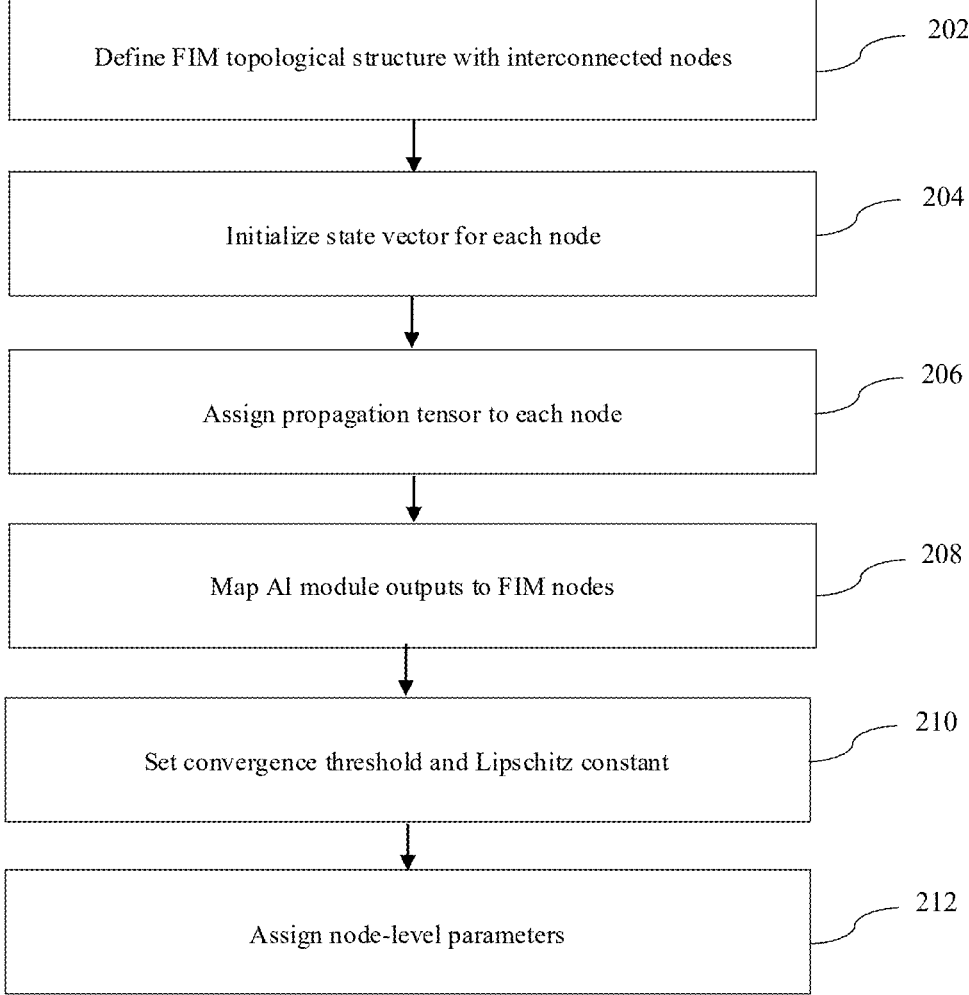
FIG. 2 is a flowchart illustrating an example method for initializing a Field Integration Matrix (FIM), in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 15, where similar reference characters denote corresponding features consistently throughout the figures, there are shown preferred embodiments and these embodiments are described in the context of the following exemplary system and/or method.

Referring now to FIG. 1, an exemplary system architecture of an AI-based computing system 104 is illustrated in accordance with one embodiment of the present disclosure. The system is designed to perform modular, state-dependent information integration through a Field Integration Matrix (FIM), enabling dynamic collaboration between multiple specialized AI modules.

The system includes the following components: a memory 102, a system bus 106, a storage unit 108, one or more hardware processors 110, and a plurality of AI modules 112.

The hardware processor(s) 110, forming part of the AI-based computing system 104, are configured to execute instructions stored in the memory 102 or the storage unit 108. These instructions cause the processor(s) to orchestrate the initialization of the Field Integration Matrix (FIM), receive influence vectors from the AI modules 112, compute dynamic propagation tensors, monitor convergence criteria, and generate contextual feedback signals to the modules.

The memory 102 is a volatile or non-volatile memory element (such as RAM, EEPROM, or cache) coupled via the system bus 106. It stores runtime variables and intermediate values such as:

Node-level state vectors of the FIM,
Directional propagation tensors,
Modulation parameters constrained by a Lipschitz constant,
and convergence-related thresholds or norms.

The storage unit 108 comprises a non-transitory storage medium (e.g., hard disk, SSD, flash drive) that stores persistent program instructions, AI module mappings, learned tensor modulation weights (if applicable), and user-defined configuration profiles.

The system bus 106 enables data communication and coordination among all system components, including between processor(s), memory, storage, and interface modules. The bus may be implemented using any suitable high-throughput interface protocol (e.g., AXI, PCIe, NVLink).

The plurality of AI modules 112 refers to a collection of independently functioning artificial intelligence subsystems, each responsible for a distinct cognitive domain. Non-limiting examples include:

Natural language understanding modules,
Symbolic reasoning engines,
Perceptual AI (e.g., image/audio interpretation),
Planning and decision-making systems,
Emotion simulation module,
Temporal or narrative identity models.

Each AI module 112 generates an influence vector that encapsulates its output, judgment, or interpretation. These vectors may be symbolic, sub-symbolic, or hybrid in format. Influence vectors are injected into the FIM via predefined or dynamically determined node mappings, enabling integration with the global cognitive context.

The AI-based computing system 104 manages a cyclical process including:

Receiving influence vectors from the AI modules 112;
Modulating directional propagation tensors at each FIM node;
Updating node-level state vectors based on directional input;
Checking convergence using a bounded criterion (e.g., $\|S(t)-S(t-1)\|_F < \varepsilon$);
Generating feedback signals routed to the appropriate modules via a feedback interface.

While not explicitly shown in FIG. 1, additional components such as convergence monitors, neural decoders, attention mappers, or feedback controllers may also be incorporated into the AI-based computing system 104.

The illustrated system is scalable and suitable for deployment in:

Cloud-hosted AI orchestration environments,
Embedded control systems in autonomous robots or vehicles,
Edge devices for time-sensitive decision-making,
Human-AI collaborative platforms, including brain-computer interfaces.

It should be appreciated that FIG. 1 represents a logical and architectural view of the system. Actual implementations may distribute components physically or virtually and may use hardware accelerators such as GPUs, TPUs, or FPGAs for enhanced performance.

Referring now to FIG. 2, a flowchart is depicted showing a method 200 for initializing the Field Integration Matrix (FIM) in the AI-based computing system 104, in accordance with one embodiment of the present disclosure. The FIM serves as a structured computational medium for integrating heterogeneous outputs from the plurality of AI modules 112 and enables state-dependent, convergent decision-making.

The initialization process begins at step 202, where the system defines a topological arrangement, such as a lattice grid or graph structure, comprising a plurality of interconnected nodes. Each node corresponds to a discrete region in the cognitive or physical space and is capable of storing a state vector and communicating with adjacent nodes via directional propagation tensors. A propagation tensor refers to a 3D structure of dimensionality D×D×K, comprising K directional weight matrices, each of size D×D, where K is the number of neighboring nodes.

Although the default embodiment uses a regular 2D lattice, alternative implementations may use irregular topologies such as sparse graphs, triangular meshes, or learned adjacency maps. These enable the system to accommodate non-Euclidean spatial layouts or abstract cognitive graphs.

At step 204, each node is assigned an initial state vector, typically a D-dimensional real-valued vector. These vectors may be initialized to zero, random noise, or pre-learned values depending on the deployment context. The state vector serves as the container for locally integrated multimodal information, including symbolic and sub-symbolic content.

At step 206, each node is further initialized with a propagation tensor—a directional weight matrix defining how information is transmitted to neighboring nodes. Each propagation tensor comprises a set of directionally distinct submatrices $(W_1, W_2, \ldots, W_k)$, each encoding how the node influences a specific adjacent node. The tensors may be initialized analytically (e.g., identity or diagonal matrices) or with learned templates, and are subject to Lipschitz continuity constraints to ensure convergence.

At step 208, the system establishes a mapping between AI modules 112 and FIM regions. Each AI module generates an influence vector representing its cognitive output. The system uses predefined rules, domain relevance, or learned attention scores to determine which nodes receive influence from each module. For example, a visual perception module may inject vectors into spatially aligned nodes, while a symbolic planner may target abstract cognitive zones.

At step 210, the system defines the convergence threshold $\varepsilon$ and selects a Lipschitz contraction constant L, typically satisfying L≤0.9. These parameters govern the iterative update cycle that follows initialization and ensure that state propagation converges within a bounded number of iterations, as defined by the inequality:

$$T_{max} \leq \log(\|S(0)\|/\varepsilon)/\log(1/L)$$

In some embodiments, an optional step 212 includes assigning additional node-level attributes such as:

Time decay constants for temporal relevance,
Confidence scores or attention masks for filtering incoming signals,
Symbolic-subsymbolic embedding flags to support hybrid reasoning.

Figure 3:
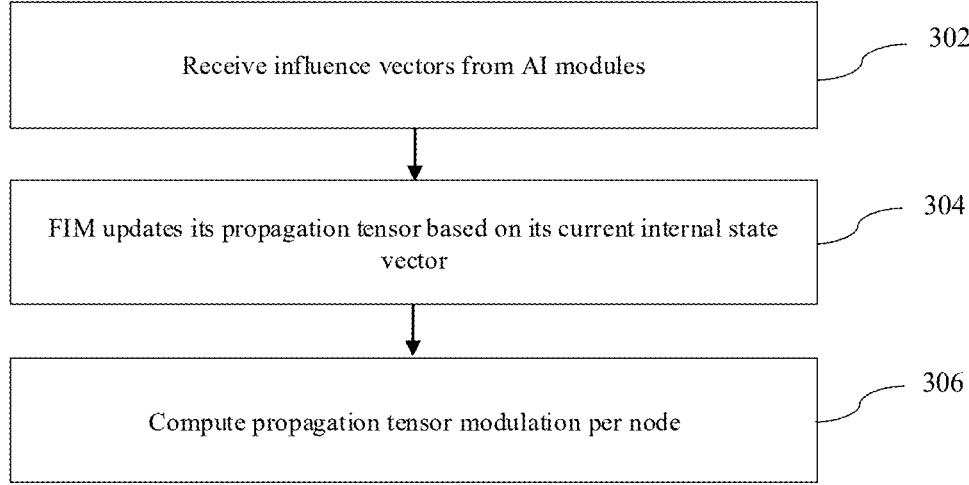
FIG. 3 is a flowchart illustrating an example three-phase update cycle for the Field Integration Matrix (FIM), in accordance with an embodiment of the present disclosure.

After this initialization sequence, the FIM is structurally and computationally ready to perform the contribution, modulation, and propagation phases, as described in FIG. 3. This initialization ensures spatial alignment, mathematical stability, and functional readiness of the integration framework before real-time cognitive interaction begins.

The method 200 may be performed by executing instructions stored in the memory 102 or storage unit 108, using the hardware processor(s) 110 of the AI-based computing system 104. The process can be initiated during system boot, scenario change, or periodically based on task context FIG. 3 is a flowchart illustrating an example three-phase update cycle for the Field Integration Matrix (FIM), including the contribution of influence vectors from AI modules, modulation of directional propagation tensors based on node state, and propagation of information across neighboring nodes to update state vectors, in accordance with one embodiment of the present disclosure.

Referring now to FIG. 3, a flowchart is shown depicting the three-phase update cycle 300 of the Field Integration Matrix (FIM), which forms the core of the integration logic in the AI-based computing system 104. This update cycle is executed iteratively by the system's hardware processor(s)

110, enabling real-time, mathematically bounded integration of diverse cognitive signals originating from the plurality of AI modules 112.

At step 302, the system receives influence vectors from one or more AI modules 112. Each influence vector represents a module's decision, prediction, interpretation, or behavioral suggestion and may be symbolic (e.g., logic predicates), sub-symbolic (e.g., neural embeddings), or a hybrid thereof.

The influence vectors are mapped to corresponding nodes in the FIM based on predefined spatial mappings, task relevance, or learned alignment parameters. For example:

A planning module might inject high-level task goals into central abstract nodes.

A sensory module might inject perceptual signals into peripheral or spatially mapped nodes.

The vectors are combined with the existing state vectors at those nodes, initiating the state update process.

At step 304, each node in the FIM updates its propagation tensor based on its current internal state vector. The propagation tensor comprises a set of directional matrices, each determining how the node communicates information to its neighbors.

The modulation function is designed to be Lipschitz-continuous, with a contraction constant $L \leq 0.9$, to ensure system-wide convergence. In one embodiment, each directional matrix $W_k$ is computed as:

$$W_k = g_k(S_i)$$

where:

$g_k$ is a direction-specific modulation function, $S_i$ is the current state vector of the node, and $W_k \in R^{\wedge}D \times D$ is the matrix applied for propagation to the k-th neighbor.

The modulation function may be implemented either:

Analytically (e.g., via rotation and gain matrices), or

Through a neural network with spectral normalization to preserve Lipschitz continuity. Spectral normalization may be computed as described in Miyato et al., 'Spectral Normalization for GANs,' ICLR 2018, ensuring Lipschitz continuity by constraining the operator norm of each weight matrix.

In some embodiments, the modulation function is strictly Lipschitz-continuous. In other embodiments, bounded-gain mappings (e.g., spectrally normalized networks or capped analytical updates) are used to guarantee stability, even if not strictly Lipschitz.

This phase enables each node to shape how its influence spreads based on its own cognitive state, thus encoding directional attention, inhibition, or reinforcement patterns.

At step 306, each node updates its state vector by aggregating incoming messages from its neighbors, each modulated by the corresponding directional tensor. Specifically, for each neighbor j, the received contribution is:

$$\Delta S_i \leftarrow W_{j \rightarrow i} \cdot S_j$$

The updated state vector at node i is given by:

$$S_i(t+1) = \Sigma_{j \in N(i)} W_{j \rightarrow i} \cdot S_j(t),$$

where N (i) is the set of neighbors for node i.

The new state vector is computed as a weighted sum of all such contributions, enabling context-aware, multi-source integration.

This phase is executed in parallel across all nodes in the FIM. Due to the Lipschitz constraint enforced during modulation, the propagation process is guaranteed to converge to a stable state over a bounded number of iterations $T_{max}$, as defined by:

$$T_{max} \leq \log(\|S(0)\|/\varepsilon)/\log(1/L)$$

Where:

$\|S(0)\|$ is the norm of the initial state, $\varepsilon$ is the convergence threshold, L is the Lipschitz contraction constant.

This convergence guarantees that the global cognitive state of the system stabilizes predictably and safely—a crucial requirement for autonomous and safety-critical applications.

At the end of each cycle, the system may perform a convergence check by computing the Frobenius norm of the global state change ($\|S(t)-S(t-1)\|$). If the change falls below the threshold $\varepsilon$, the update cycle halts and the integrated state can be used for action selection, feedback routing, or further cognitive processing. For instance, an AI module may use the received context vector to adjust its internal inference threshold or re-weight its decision tree traversal depth based on system-wide urgency.

In an embodiment of the disclosure, convergence is reached when $\|S(t)-S(t-1)\| \leq \varepsilon$, or when a monotonic decrease in error norm is detected over a predefined number of iterations.

The update cycle 300 may be performed continuously or triggered periodically depending on task load, environmental events, or internal planning states. This modular execution is orchestrated by the hardware processor(s) 110, utilizing memory 102 for intermediate storage and interacting with AI modules 112 via high-speed communication channels (e.g., through system bus 106).

Referring to FIG. 4, a flowchart is illustrated showing a method 400 for dynamically modulating the propagation tensor associated with each node in the Field Integration Matrix (FIM), in accordance with one embodiment of the present disclosure. The propagation tensor defines how directional influence is passed to neighboring nodes during the propagation phase of the update cycle.

The method begins at step 402, where the system retrieves the current state vector $S_i$ of the node. This state vector represents the node's local integrated cognitive state, including contributions from AI module influence vectors and past iterations.

At step 404, the system selects a modulation approach for computing the directional matrices $W_k$ that make up the node's propagation tensor. Two primary approaches are supported: an analytical formulation or a neural network-based modulation.

If the analytical path is selected, the system proceeds to step 406A. In this step, each directional matrix $W_k$ is computed as:

$$W_k = \sigma_k \cdot R_K \cdot \Lambda_k \cdot R_K^T$$

where $\sigma_k$ is a scalar conductivity ($0 \leq \sigma_k \leq 1$), $R_k$ is a DxD rotation matrix encoding directional orientation, and $\Lambda_k$ is a diagonal gain matrix. This formulation allows explicit and interpretable control over directional information flow. For example, propagation toward known obstacles may be attenuated by reducing $\sigma_k$ in those directions.

If the neural network path is selected, the system proceeds to step 406B. In this step, each $W_k$ is computed using a neural network $NN_k$ that receives the state vector $S_i$ as input and outputs a DxD directional matrix:

$$W_k = NN_k(S_i; \sigma_k)$$

Each neural network $NN_k$ is trained under spectral normalization constraints to ensure Lipschitz continuity, maintaining system convergence. The learned modulation enables adaptive, nonlinear propagation that reflects complex cognitive dynamics.

At step 408, the system verifies that the resulting directional matrices satisfy the Lipschitz constraint:

$$\|g_k(x) - g_k(y)\| \leq L \cdot \|x - y\|, \text{ with } L \leq 0.9$$

This constraint ensures bounded state evolution and guarantees that the iterative propagation process converges within a predictable number of steps. Spectral normalization or analytical bounding may be used to enforce this condition.

At step 410, the newly computed directional matrices $W_k$ are assigned to the propagation tensor of the corresponding node. These matrices will be used during the propagation phase to control how the node's state vector influences its neighbors in the next update cycle.

In some implementations, the system may augment the propagation tensor with auxiliary components such as symbolic-subsymbolic partitioning, time-decay modulation, or confidence masking, depending on the use case.

The modulation method 400 ensures that each node in the FIM has a context-sensitive, mathematically constrained mechanism for shaping its influence on the surrounding cognitive field. This supports stable, interpretable, and scalable integration of heterogeneous AI module outputs in real time.

Figure 5:
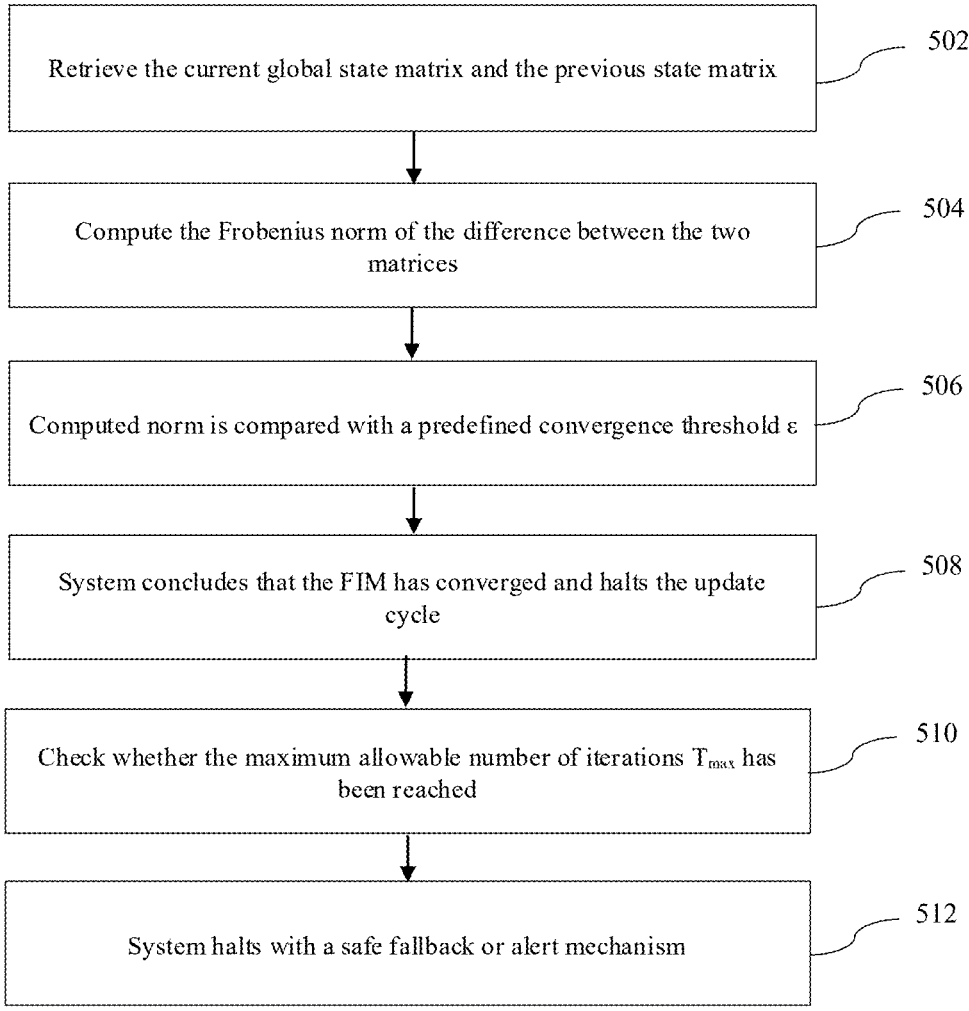
FIG. 5 is a flowchart illustrating a method for convergence monitoring of the Field Integration Matrix (FIM) based on the Lipschitz constant and convergence threshold, in accordance with an embodiment of the present disclosure.

Referring to FIG. 5, a flowchart is shown depicting a method 500 for convergence monitoring in the Field Integration Matrix (FIM), in accordance with one embodiment of the present disclosure. The method ensures that the iterative update cycles terminate within a predictable number of steps by enforcing a Lipschitz constraint on the propagation tensors.

The method begins at step 502, where the system retrieves the current global state matrix S(t) and the previous state matrix S (t−1), each comprising the state vectors of all nodes in the FIM at consecutive time steps.

At step 504, the system computes the Frobenius norm of the difference between the two matrices:

$$\|S(t) - S(t-1)\| \cdot F$$

This norm quantifies the overall change in the global state and serves as a measure of convergence progress.

At step 506, the computed norm is compared with a predefined convergence threshold ε. If the value is less than, the system concludes that the FIM has converged and halts the update cycle at step 508.

If the norm is greater than ε, the system proceeds to step 510 to check whether the maximum allowable number of iterations $T_{max}$ has been reached. The theoretical upper bound for $T_{max}$ is defined by:

$$T_{max} \leq \log(\|S(0)\| / \varepsilon) / \log(1/L)$$

where S(0) is the initial state and L is the Lipschitz contraction constant (L≤0.9).

If the maximum iteration count is exceeded, the system halts with a safe fallback or alert mechanism at step 512. If not, the cycle continues at step 514 with the next iteration.

This convergence monitoring method guarantees deterministic integration latency and ensures safety in real-time environments such as robotics and autonomous vehicles.

Referring to FIG. 6, a flowchart is depicted showing a method 600 for applying the Field Integration Matrix (FIM)

in a robotic navigation scenario, in accordance with one embodiment of the present disclosure.

At step 602, the system receives environmental input from sensors, such as LiDAR, cameras, or depth sensors, and converts the data into semantically tagged features like obstacle likelihood, goal location, and path clearance.

At step 604, the system maps these features into influence vectors generated by specialized AI modules 112, such as perception, planning, and threat detection modules.

At step 606, the influence vectors are injected into the FIM nodes that correspond spatially to the locations detected in the physical environment. For example, a node aligned with a wall may receive a repulsion vector, while a node near a goal may receive an attraction vector.

At step 608, the FIM performs its standard contribution, modulation, and propagation cycle, dynamically integrating the influence vectors while respecting local directional constraints, such as obstacle avoidance.

At step 610, the system computes a gradient from the current location toward the goal based on the integrated state vectors of neighboring nodes.

At step 612, the gradient is used to issue navigation commands to the robot, such as steering or acceleration updates, thus closing the control loop.

This method allows the robot to dynamically adapt to environmental changes, handle obstacles, and maintain goal alignment in real time using a mathematically stable and interpretable cognitive substrate.

Figure 7:
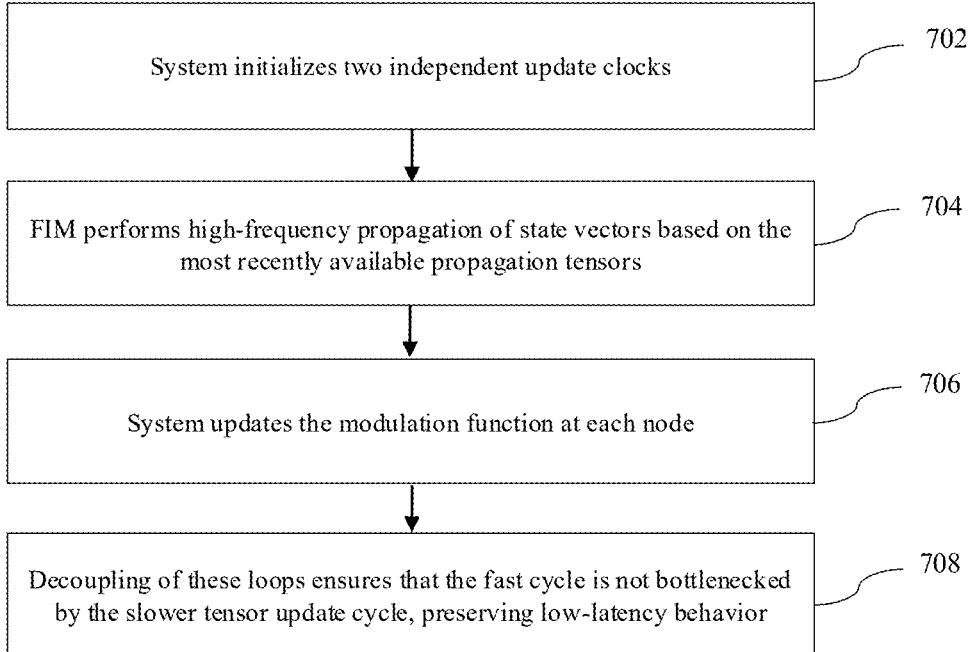
FIG. 7 is a flowchart illustrating a multi-speed update architecture, in accordance with an embodiment of the present disclosure.

Referring to FIG. 7, a flowchart is shown depicting a method 700 for multi-speed processing in the Field Integration Matrix (FIM), in accordance with one embodiment of the present disclosure. The method separates fast state updates from slower modulation updates, enabling both responsiveness and deep context modeling.

At step 702, the system initializes two independent update clocks: a fast clock (e.g., 500-1000 Hz) for state vector updates, and a slow clock (e.g., 1-10 Hz) for propagation tensor modulation.

At step 704, under the fast clock, the FIM performs high-frequency propagation of state vectors based on the most recently available propagation tensors. This fast loop enables real-time responsiveness for tasks such as collision avoidance or motion planning.

At step 706, under the slower clock, the system updates the modulation function at each node, thereby refreshing the propagation tensors based on the evolving internal state vectors. This slower loop supports higher-order cognitive functions like re-prioritization, attention shifts, or motivational changes.

At step 708, the decoupling of these loops ensures that the fast cycle is not bottlenecked by the slower tensor update cycle, preserving low-latency behavior.

This architecture allows the FIM to operate in complex environments requiring both short-term reflexes and long-term reasoning, such as human-robot collaboration or Referring to FIG. 8, a flowchart is illustrated showing a method 800 for hybrid symbolic and subsymbolic integration within a node of the Field Integration Matrix (FIM), in accordance with one embodiment of the present disclosure.

At step 802, the system receives influence vectors from one or more AI modules 112, with each vector containing both a symbolic component (e.g., logic rules, predicates) and a subsymbolic component (e.g., neural embeddings, continuous values).

At step 804, the symbolic and subsymbolic parts are separated or identified using metadata or format tags and are projected into distinct partitions of the node's state vector. This results in a hybrid vector of the form [v_sym; v_sub].

At step 806, during the modulation phase, the propagation tensor is partitioned into two blocks:

A symbolic transformation block for rule-based propagation.

A subsymbolic transformation block for embedding-based blending.

At step 808, during the propagation phase, each block independently transforms its corresponding part of the state vector, allowing logical structure and neural approximation to coexist and evolve within the same node.

At step 810, the updated symbolic and subsymbolic vectors are recombined to form the new hybrid state vector for the node, completing the update.

In some cases, symbolic and subsymbolic data may not be cleanly separable. The system may dynamically project data into latent symbolic axes using supervised or unsupervised embeddings to maintain flexible partitioning.

This method enables seamless interoperability between rule-based and learning-based systems, allowing for transparent, interpretable reasoning while retaining expressive power across diverse cognitive domains.

Referring to FIG. 9, a flowchart is illustrated showing a method 900 for hardware implementation of the Field Integration Matrix (FIM) using a parallel array of dedicated tensor processors, in accordance with one embodiment of the present disclosure.

At step 902, the system instantiates a plurality of tensor processing units (TPUs), with each processor corresponding to a node in the FIM. Each processor is configured to maintain a local state vector, perform directional tensor computations, and propagate influence to neighbor processors.

At step 904, a local memory bank is coupled to each processor, storing node-specific data such as the current state vector, propagation tensors, modulation parameters, and received influence vectors.

At step 906, a convergence monitoring unit is implemented to track the Frobenius norm $\|S(t)-S(t-1)\|$ across all processors. This can be implemented either as a distributed comparison logic or as a centralized controller that aggregates node-level signals.

At step 908, a high-bandwidth interconnect fabric is initialized to allow low-latency directional message passing between processors. Each processor only communicates with its K immediate neighbors, preserving the grid-like structure of the FIM.

At step 910, the hardware system is clocked to execute the contribution, modulation, and propagation phases in real time, achieving update frequencies suitable for safety-critical applications such as autonomous navigation or robotic surgery.

This method enables the physical realization of the abstract FIM model, with strict timing guarantees, scalability across devices, and compatibility with embedded and edge-deployable AI platforms.

Referring to FIG. 10, a flowchart is shown depicting a method 1000 for implementing a multi-resolution Field Integration Matrix (FIM), in accordance with one embodiment of the present disclosure. This hierarchical architecture supports global-to-local cognitive integration.

At step 1002, a coarse-scale matrix is initialized to represent high-level cognitive concepts such as task planning, motivational context, or symbolic reasoning. Each node in this layer integrates long-term goals and abstract cognitive features.

At step 1004, a fine-scale matrix is initialized to represent perceptual and motor-level signals, such as environment sensing, path cost evaluation, or actuator feedback. These nodes are spatially aligned with the robot's or agent's operational environment.

At step 1006, inter-resolution propagation tensors are computed to map information between the coarse and fine layers. These mappings allow top-down influence (from abstract to concrete reasoning) and bottom-up aggregation (from sensory input to global understanding).

At step 1008, both layers execute independent update cycles using their respective clocks and frequencies, while periodically exchanging summarized or downsampled information via the inter-resolution tensors.

At step 1010, the system synthesizes global and local cognitive states into a unified representation used for decision-making, enabling consistency and reactivity across different cognitive scales.

This method enables complex applications such as autonomous vehicles or long-horizon planning agents to reason simultaneously at symbolic and sensorimotor levels within a stable, scalable framework.

Figure 11:
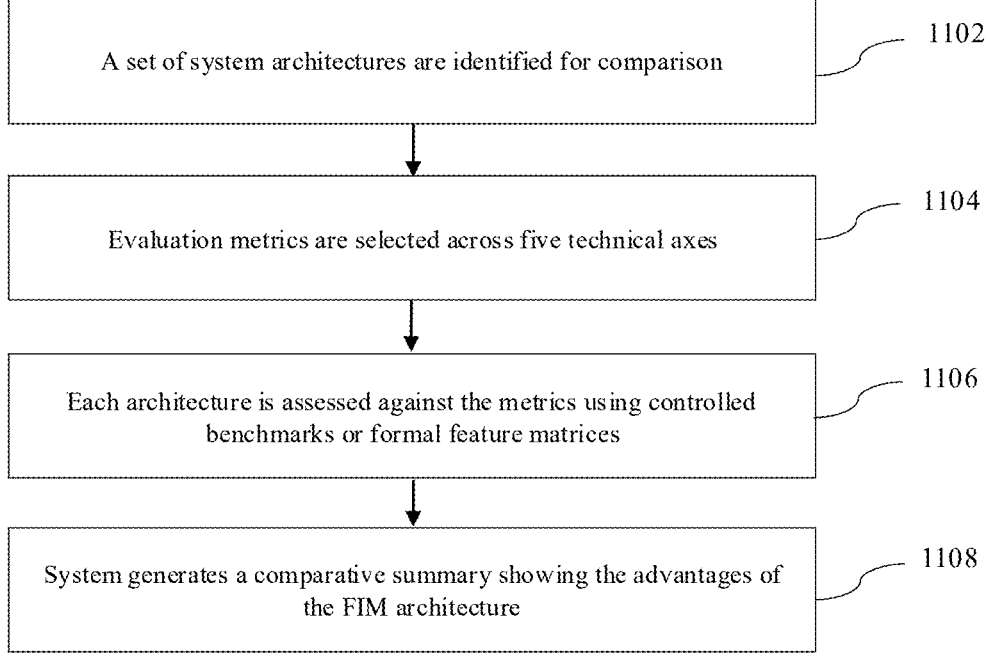
FIG. 11 is a flowchart illustrating a comparative evaluation process between the Field Integration Matrix (FIM) and prior art architectures, in accordance with an embodiment of the present disclosure.

Referring to FIG. 11, a flowchart is illustrated showing a method 1100 for comparative evaluation between the proposed Field Integration Matrix (FIM) architecture and other prior art systems such as Graph Neural Networks (GNNs), Neural Cellular Automata (NCAs), and Transformer networks.

At step 1102, a set of system architectures are identified for comparison, including FIM, GNN, NCA, and Transformer-based models.

At step 1104, evaluation metrics are selected across five technical axes:

Structural basis (grid vs. graph vs. sequence)

Propagation mechanism (directional vs. symmetric vs. global)

Convergence behavior (bounded vs. unbounded)

Feedback capability (closed-loop vs. feedforward)

Symbolic representation support (hybrid vs. embedding-only)

At step 1106, each architecture is assessed against the metrics using controlled benchmarks or formal feature matrices.

At step 1108, the system generates a comparative summary showing the advantages of the FIM architecture, including:

Grid-structured real-time reasoning,

Lipschitz-constrained propagation with bounded convergence,

Bidirectional feedback between modules and global state,

Hybrid symbolic-subsymbolic integration,

Hardware scalability and deployment readiness.

This comparative evaluation provides justification for the novelty and superiority of the disclosed system relative to existing cognitive integration architectures.

Referring to FIG. 12, a flowchart is shown depicting a method 1200 for generating and routing feedback signals from the Field Integration Matrix (FIM) to the plurality of AI modules 112, in accordance with one embodiment of the present disclosure.

At step 1202, the system identifies a relevant region $R_m$ of the FIM corresponding to a given AI module m. This region may be predefined or dynamically determined based on module function or influence mapping.

At step 1204, the system computes a context vector $C_m(t)$ by aggregating the state vectors of all nodes in $R_m$ using static or learned attention weights $\alpha_{m,i}$:

$$C_m(t) = \Sigma\_\{i \in R_m\}\alpha_{m,i} \cdot S_i(t)$$

This vector summarizes the local state context relevant to the module's domain.

At step 1206, the context vector is routed to the originating AI module via the system bus 106 or dedicated feedback interface. The AI module uses this signal to adjust its internal model, refine its next output, or maintain synchronization with the global cognitive state.

In an embodiment of the disclosure, feedback vectors may adjust the inference thresholds, learning rate, or activation states of AI modules, creating a self-regulating architecture that adapts to global cognitive context.

At step 1208, the system may apply additional rules such as gating (feedback only when thresholds are crossed) or predictive routing (feedback based on expected future states).

This feedback loop enables dynamic two-way communication between individual modules and the collective cognition encoded in the FIM, improving coherence, stability, and adaptivity in real-time AI systems.

Referring to FIG. 13, a flowchart is shown illustrating a method 1300 for integrating signals from a brain-computer interface (BCI) into the Field Integration Matrix (FIM), in accordance with one embodiment of the present disclosure.

At step 1302, the system receives neural signals from a BCI device worn or implanted on a user. These signals may include EEG, ECoG, or other neurophysiological recordings corresponding to cognitive intent, emotional state, or motor imagery. In some embodiments, the system may coordinate across multiple AI agents, such as in collaborative multi-agent systems operating with shared FIM overlays or decentralized state updates.

At step 1304, a neural signal decoder module processes the raw input using filtering, dimensionality reduction, and classification models to convert it into a structured influence vector.

At step 1306, the decoded influence vector is mapped to a specific set of nodes within the FIM based on semantic alignment or spatial context. For example, intent to navigate may be injected into motor-aligned nodes, while emotional state may influence narrative identity nodes.

At step 1308, the FIM performs its standard update cycle (contribution, modulation, propagation), incorporating the BCI-derived influence along with signals from other AI modules.

At step 1310, the updated global state may be used to issue feedback to the BCI system, adjust downstream actuators, or influence high-level decision-making. Optionally, the FIM may adapt its interpretation model based on signal consistency or user feedback.

This method allows real-time, closed-loop integration of human cognitive input into the AI-based computing system, enabling enhanced collaboration, intention alignment, and neural augmentation.

Referring to FIG. 14, a flowchart is shown depicting a method 1400 for deploying the Field Integration Matrix (FIM) in safety-critical environments, such as autonomous vehicles, industrial robots, or surgical systems, in accordance with one embodiment of the present disclosure.

At step 1402, the system monitors environmental inputs and internal module outputs for high-risk or uncertain conditions, such as rapid obstacle approach, low confidence decisions, or abnormal neural patterns.

At step 1404, the FIM state vectors across relevant nodes are analyzed for instability using metrics such as excessive change magnitude ($\|S(t)-S(t-1)\|$), non-convergence, or contradictory influence patterns.

At step 1406, if a safety threshold is exceeded, the system activates an override logic that freezes influence vector injection and halts modulation updates. The current state is preserved, and a local snapshot is taken.

At step 1408, a predefined fail-safe behavior is executed, which may include stopping all motion, switching to manual control, triggering alert notifications, or reverting to last-known-safe state vectors.

At step 1410, once the safety condition is cleared and normal behavior is verified, the system resumes the standard FIM update cycle and reintroduces influence vectors under monitored conditions.

This method ensures that the FIM-based reasoning remains bounded, interpretable, and fail-safe under extreme or ambiguous conditions, satisfying real-world deployment standards for trust and safety.

Referring to FIG. 15, a flowchart is illustrated showing a method 1500 for integrating outputs from planning, motivational, and identity modules using the Field Integration Matrix (FIM), in accordance with one embodiment of the present disclosure.

At step 1502, a planning module generates a set of goal-oriented influence vectors representing the agent's immediate objectives, such as reaching a destination or completing a task.

At step 1504, a motivational module computes contextual urgency, emotional drive, or internal rewards, producing influence vectors that reflect task importance, energy level, or preferred strategies.

At step 1506, an identity module tracks long-term personality, consistency constraints, or ethical boundaries, and produces influence vectors that bias decision-making toward coherent, self-aligned behavior.

At step 1508, all three types of influence vectors are injected into designated regions of the FIM. Planning inputs target task-aligned nodes, motivational inputs modulate propagation intensity, and identity inputs introduce long-horizon preferences.

At step 1510, the FIM performs its standard integration cycle to reconcile short-term goals, emotional urgency, and narrative identity, resulting in a coherent cognitive state vector across the matrix.

At step 1512, the integrated state is used to generate actions, internal feedback, or external communication, ensuring that the AI behaves in a contextually appropriate, goal-consistent, and narratively aligned manner.

This method enables holistic cognitive behavior by fusing deliberative planning, affective reasoning, and identity preservation into a single stable integration framework.

The described FIM framework can be implemented on dedicated tensor processors, conventional CPUs/GPUs, or hybrid hardware-software systems. No specific chip architecture is required.

The present invention offers a novel architecture for cognitive integration that bridges the gap between symbolic and sub-symbolic artificial intelligence. Unlike conventional architectures such as Graph Neural Networks (GNNs), Neural Cellular Automata (NCAs), or Transformer-based systems, the disclosed Field Integration Matrix (FIM) enables modular, state-dependent, and mathematically bounded integration of influence vectors originating from a plurality of independently functioning AI modules. This allows for structured, interpretable, and real-time coordination across diverse cognitive domains such as perception, planning, motivation, and identity reasoning.

One of the key advantages of the invention lies in its Lipschitz-constrained propagation model, which guarantees convergence of the global system state within a bounded number of iterations. This mathematical rigor is critical for deploying the system in real-world environments, especially in safety-critical applications like robotics, autonomous vehicles, and medical AI. The convergence guarantee enables predictable latency, stability, and repeatability of cognitive decisions, outperforming purely learned models which may exhibit unstable or divergent behavior.

Another benefit of the invention is its multi-speed update architecture, which separates fast-loop propagation from slower-loop modulation. This design supports both reactive and deliberative cognition by allowing different components of the system to operate at appropriate temporal granularities. For example, perception-related updates can occur at high frequency to support collision avoidance, while motivational or strategic planning updates can occur more slowly to support long-term coherence.

The disclosed architecture also supports hybrid symbolic-subsymbolic reasoning at the level of individual nodes. This dual-capability allows the system to handle both rule-based knowledge (e.g., logic constraints, ethical boundaries) and statistical embeddings (e.g., sensory interpretations, learned features), enabling rich, interpretable behavior that evolves over time. It preserves the explainability of traditional symbolic systems while benefiting from the adaptability and representation power of sub-symbolic methods.

In an embodiment of the disclosure, an influence vector may include: (a) a float32 array of sensory embeddings; (b) sparse symbolic tags mapped to dimensions; or (c) multi-hot or learned representation vectors.

In an embodiment of the disclosure, a propagation tensor is a multi-dimensional array $W_k \in R^\hat{}D \times D \times K$ encoding directional weights, where each slice represents propagation to a specific neighbor.

Moreover, the invention supports closed-loop feedback from the FIM to the original AI modules. This feedback mechanism enables real-time adjustment of module behavior based on global context, thereby promoting synchronization, learning, and behavioral stability. Modules no longer operate in isolation but adaptively respond to the integrated cognitive state, enabling self-regulating and coordinated intelligence.

The architecture is also hardware-deployable and parallelizable. The FIM can be implemented using arrays of tensor processors and local memory banks, allowing it to scale to high-dimensional cognitive tasks while maintaining real-time performance. This enables edge deployment, energy efficiency, and robust integration with neuromorphic or BCI systems The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A hardware-based artificial intelligence (AI) integration system, comprising:
   at least one processor;
   a memory communicatively coupled to the processor, the memory storing computer-executable instructions that, when executed by the processor, cause the system to:
      receive a plurality of influence vectors from a plurality of specialized AI modules, each configured to generate the influence vector based on a distinct cognitive function;
      initialize a Field Integration Matrix (FIM) comprising a grid or graph of interconnected nodes, wherein said nodes may form a regular lattice or an irregular topology with directional adjacency mappings, wherein each node includes:
         a state vector representing local integrated information; and
         a local propagation tensor comprising directionally-dependent weight matrices for information transfer to neighboring nodes;
      dynamically modulate each propagation tensor using a Lipschitz-continuous function of the node's current state vector, with a contraction constant $L \leq 0.9$;
      iteratively update the state vectors in a multi-phase update cycle, comprising:
         applying influence vectors to nodes (contribution phase),
         modulating propagation tensors (modulation phase),
         updating neighbor states via anisotropic tensor-gated propagation (propagation phase);
      monitor convergence based on the condition:

$T_{max} \leq \log(\|S(0)\|/\varepsilon)/\log(1/L)$; and transmit feedback signals from the FIM to the specialized AI modules to modulate subsequent outputs.

2. The system of claim 1, wherein the propagation tensor is a D×D×K-dimensional structure, with each component matrix $W_k \in R^{D \times D}$ representing directional propagation to a neighbor node, and wherein the specialized AI modules are independently updatable or deployable, and the integration framework coordinates their outputs via a shared propagation structure.

3. The system of claim 1, wherein the specialized AI modules include at least one of:
   a natural language processor,
   a symbolic reasoning engine,
   a sensory input module,
   a planning or task-execution module,
   a motivational architecture, or
   an emotion simulation module.

4. The system of claim 1, wherein the feedback signals comprise contextual state summaries extracted using weighted attention over selected FIM regions, and wherein at least one directional matrix is computed using a neural attention mechanism that assigns weights based on relevance or temporal history.

5. The system of claim 1, wherein at least one influence vector includes:
   a symbolic component comprising discrete logic rules or predicates, and
   a subsymbolic component comprising continuous vector embeddings.

6. The system of claim 1, further comprising an introspective safety module configured to detect instability, internal contradiction, or ethical violations in node state evolution, and trigger override behavior.

7. The system of claim 1, further comprising a temporal decoupling controller, configured to update:
   state vectors at high frequency between 100 to 1000 Hz, and
   propagation tensors at lower frequencies between 1 to 10 Hz.

8. The system of claim 1, further comprising a real-time convergence hardware subsystem including:
   dedicated tensor processors,
   convergence monitors, and
   memory banks,
   configured to achieve convergence within sub-100 millisecond latency.

9. The system of claim 1, wherein the FIM comprises a multi-resolution hierarchical structure connected via inter-resolution propagation tensors, with fine- and coarse-scale grids connected via inter-level propagation tensors, and wherein the Lipschitz constraint on the modulation function is enforced using spectral normalization of neural networks.

10. The system of claim 1, wherein the AI integration system is configured to receive human input via a brain-computer interface (BCI) and inject the received input as one or more influence vectors into the FIM.

11. A computer-implemented method for real-time integration of heterogeneous AI module outputs, comprising:
   receiving, via at least one processor, a plurality of influence vectors from specialized AI modules representing distinct cognitive functions;
   initializing a Field Integration Matrix (FIM) comprising a grid or graph of interconnected nodes, wherein said nodes may form a regular lattice or an irregular topology with directional adjacency mappings, each node having:
      a state vector; and
      a propagation tensor defining directional weights;
   modulating each node's propagation tensor using a Lipschitz-continuous function of its current state vector;
   propagating state updates to neighboring nodes using the modulated tensors in a directionally-weighted manner;

executing an iterative multi-phase update cycle comprising contribution, modulation, and propagation;

determining convergence when the state change falls below a threshold ε according to:

$$T_{max} \leq \log(\|S(0)\|/\epsilon)/\log(1/L); \text{ and}$$

sending integrated feedback signals from the FIM to the corresponding AI modules.

12. The method of claim 11, wherein the modulation function is implemented using a neural network with parameters constrained to ensure a Lipschitz constant≤0.9.

13. The method of claim 11, further comprising encoding each influence vector with:

symbolic elements representing discrete reasoning logic; and continuous embeddings representing neural outputs.

14. The method of claim 11, wherein the iterative update cycle includes:

receiving influence vectors, dynamically updating propagation tensors, and updating state vectors based on neighbor propagation.

15. The method of claim 11, wherein the influence vectors originate from modules representing at least:

a planning subsystem, a motivational subsystem, and a temporal continuity module maintaining narrative identity.

16. The method of claim 11, wherein the FIM is implemented using a parallel hardware array of processors operating at a clock frequency exceeding 1 kHz.

17. The method of claim 11, wherein the system is configured to achieve convergence within a latency of less than 100 milliseconds.

18. The method of claim 11, wherein updates to propagation tensors and state vectors are decoupled temporally, allowing multi-speed cognition.

19. The method of claim 11, further comprising receiving electrophysiological signals from a human user through a BCI, which are transformed into influence vectors to guide system behavior.

20. The method of claim 11, wherein the final integrated state vectors of the FIM are used to generate control signals for autonomous systems including:

mobile robots, autonomous vehicles, or collaborative multi-agent systems.

* * * * *